United States Patent [19]

Stenson

[11] Patent Number: 4,803,823
[45] Date of Patent: Feb. 14, 1989

[54] RIGID INSULATION CORNER FASTENER

[76] Inventor: John F. Stenson, 34144 Alta Loma Dr., Farmington, Mich. 48024

[21] Appl. No.: 43,490

[22] Filed: Apr. 28, 1987

[51] Int. Cl.⁴ .............................................. E04B 1/38
[52] U.S. Cl. ...................... 52/506; 52/410; 52/512; 403/405.1; 411/462; 411/466
[58] Field of Search .............. 411/466, 461, 462, 531; 52/512, 506, 410, 464, 468, 582; 403/406.1, 405.1

[56] References Cited

U.S. PATENT DOCUMENTS

| Re. 28,408 | 5/1975 | Nelsson | 52/468 X |
|---|---|---|---|
| D. 236,428 | 8/1975 | Stewart et al. | 411/531 X |
| 549,905 | 11/1895 | Durham | 52/468 |
| 1,430,996 | 10/1922 | Horlin | 52/468 |
| 1,639,072 | 8/1927 | Betz | 52/468 |
| 2,201,129 | 5/1940 | Weiland | 52/509 |
| 2,303,103 | 11/1942 | Adams | 411/461 X |
| 2,379,179 | 6/1945 | Petersen | 411/466 X |
| 2,764,788 | 10/1956 | Macormack | 52/468 |
| 2,937,418 | 5/1960 | Sanford | 411/466 X |
| 3,778,942 | 12/1973 | Bondi | 52/509 X |
| 3,905,169 | 9/1975 | Gallo | 52/509 X |
| 3,961,453 | 6/1976 | Couwenbergs | 52/509 |
| 4,185,430 | 1/1980 | Gartung | 52/582 X |
| 4,380,413 | 4/1983 | Dewey | 52/410 |
| 4,382,353 | 5/1983 | Kelly | 52/506 |
| 4,430,837 | 2/1984 | Kirschenbaum | 52/506 |

FOREIGN PATENT DOCUMENTS

| 327231 | 10/1920 | Fed. Rep. of Germany | 411/466 |
|---|---|---|---|
| 2827503 | 1/1980 | Fed. Rep. of Germany | 52/509 |
| 2844723 | 4/1980 | Fed. Rep. of Germany | 52/509 |
| 997914 | 9/1951 | France | 411/466 |
| 1041751 | 6/1953 | France | 52/464 |
| 1362380 | 4/1964 | France | 411/466 |
| 8001321 | 9/1980 | Netherlands | 52/410 |
| 86691 | 5/1956 | Norway | 411/531 |
| 90360 | 9/1937 | Sweden | 403/405.1 |
| 229396 | 2/1925 | United Kingdom | 411/531 |
| 547551 | 9/1942 | United Kingdom | 411/531 |

Primary Examiner—Lloyd A. Gall
Attorney, Agent, or Firm—Basile and Hanlon

[57] ABSTRACT

The fastener can be made of metal or plastic in the form of a semi-flat disc or plate, with some reinforcing ridges if required. The disc or plate can be of various geometric shapes and dimension. At the center of the disc or plate surface is a small hole for inserting an anchoring screw, nail or bolt. On the underside of the disc or plate, vertical projections extend downwardly at angular positions corresponding to 0, 90, 180 and optional 270 degrees with respect to the small hole. The fastener is placed at the intersecting corners formed by abutting edges of rigid insulation boards, arranged in a "stack" or "running" bond pattern. The vertical projections of the fastener insert down into the aforementioned intersecting corners. These vertical projections resist insulation lateral movement or creep after securement of the rigid insulation corner fastener. The top inserted anchoring screw, nail or bolt is then rotated, driven or tightened into or through the substrate (deck) compressing the rigid insulation between the fastener, and the substrate (deck). This invention secures surface areas of three or four different adjacent rigid insulation boards with one fastener, depending on the installer selecting a "running" or "stack" bond installation pattern.

10 Claims, 3 Drawing Sheets

RIGID INSULATION CORNER FASTENER

BACKGROUND OF THE INVENTION

1. Field of the Invention

The invention relates to a fastener for securing rigid insulation panels in place and, more particularly, to a corner fastener for securing the corners of adjacent rigid insulation boards without puncturing the rigid insulation boards.

2. Description of the Prior Art

Rigid board-type insulation, utilized under roofing has been secured in place to the underyling surface or substrate by many methods. The vast majority, approximately 99% are secured by one of three methods outlined in the following summary.

On sloped roofs, usually having a slop of over 3 inches per foot, nails with either common or with large flat heads are randomly spaced and driven through the insulation into the substrate. This method is used when the succeeding roof cover application requires additional nailing. This additional nailing penetrates the roofing, plus the insulation, down into the substrate providing additional means of securement. The preceding is not the case as the roof decreases in slope towards horizontal. Most low or no-slope commercial and industrial roofing membrane coverings do not permit through nailing. The most important reason for omitting nailing is, low slope construction invites ponding, forming a head of water against the nail penetrations which are not waterproofed and therefore causes leaks into the structure.

A second method to secure insulation to the substrate is by mopping, pouring or brushing various types and quantities of adhesives. Some adhesives are expensive and some are short-lived due to age-dry or hardening. Some fail because of their solubility in the presence of water. The coefficient of adhesiveness fluctuates and strong winds cause separation of the insulation from the substrate, thereby creating problems associated with wind damage or loss of roofing.

For some years major Insurance Underwriters and Building Code Officials have specifically warned about wind-uplift forces that cause delamination of insulation from the substrate. To satisfy the concern relating to wind damage losses, another or third method of securement was devised which included small discs of various size and material. The disc was provided with a small hole in the center which received a pull-down screw. The discs were placed on top of and in the field of the insulation, usually spaced six inches in from the perimeter edges. Dimensions of the insulation board, either two by four feet or three by four feet, etc. and the geographical area (tornado or hurricane), determined the quantity of discs required for installing the insulation.

In addition to the wind uplift problem there is another problematic characteristic of insulation; a shrinkage phenomena. The shrinkage is particulary prevalent in the expanded thermoplastic foam types. This shrinkage phenomena is most notable under roof applications where, hundreds of adjacent insulation boards have contracted or shifted, in mass, away from the building parapets or eave edges. This longituinal movement, sometimes over one inch fatigues or over stresses the membrane roof covering to the point of fracture which causes a serious roof leak and resultant damages.

SUMMARY OF THE INVENTION

The present invention improves upon all of the prerequisites of existing technology for rigid insulation fasteners. The primary improvements offered by this invention over the existing methods are as follows:
- fewer fasteners are required
- lower fastener cost to complete project
- fewer deck or substrate perforations
- reduced field labor costs
- improved resistance to longitudinal movement of insulation.

The rigid insulation corner fastener of the present invention affixes insulation to a surface. The rigid insulation corner fastener is placed at the intersection formed by the corners of adjacent rigid insulation boards and is screwed, nailed or bolted through its' axis center to a draw-down compression condition against the insulation surfaces. The rigid insulation corner fastener serves three purposes. First, the corner fastener secures the insulation to the substrate below to secure the insulation from wind lift-off. Second, the corner fastener reduces the frequency, or required number of insulation fasteners. Third, the corner fastener resists longitudinal movement of the insulation.

BRIEF DESCRIPTION OF THE DRAWINGS

These and other objects, features and advantages of the invention will become more apparent by reference to the following specification to be read in context with the attendant drawings, in which.

DESCRIPTION OF THE PREFERRED EMBODIMENTS

Figure 1:
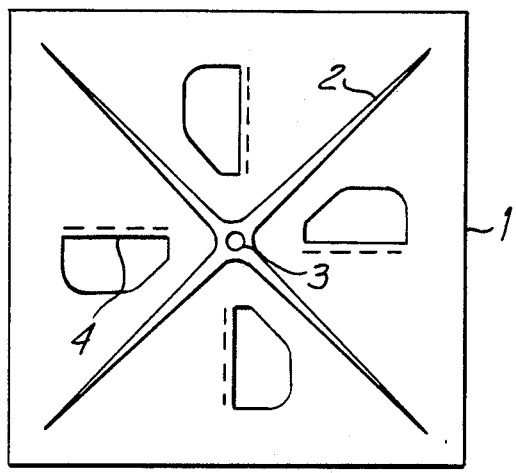
FIG. 1 is a top view of a metal fastener constructed according to the present invention.
Figure 2:
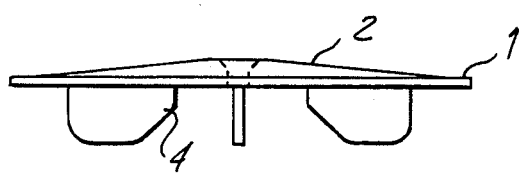
FIG. 2 is a side or end view of the fastener shown in FIG. 1.
Figure 3:
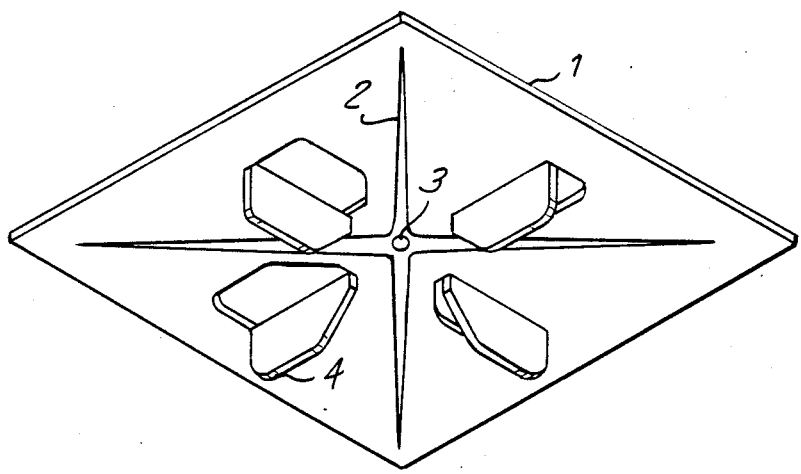
FIG. 3 is a perspective view showing the underside of the fastener shown in FIG. 1.
Figure 4:
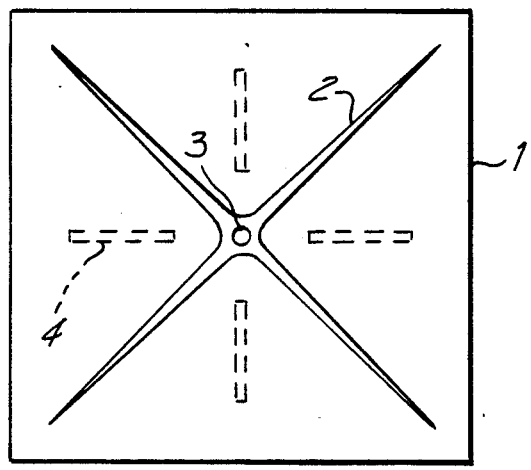
FIG. 4 is a a top view of a plastic fastener constructed according to the present invention.
Figure 5:
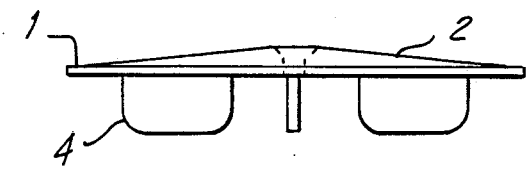
FIG. 5 is a side or end view of the fastener shown in FIG. 4.
Figure 6:
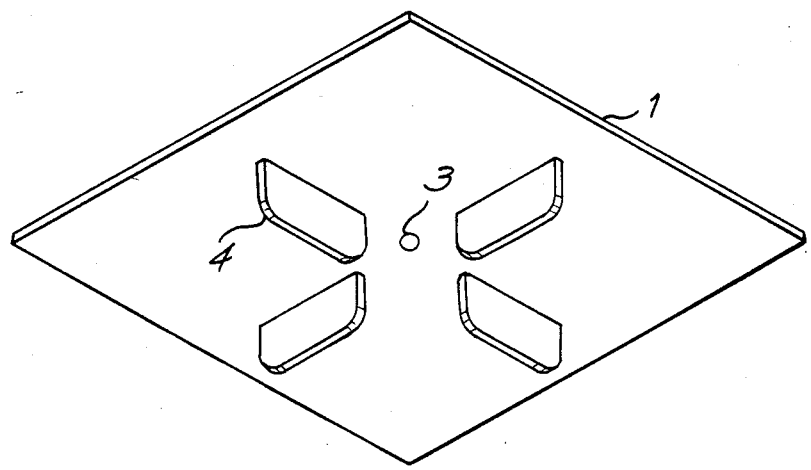
FIG. 6 is a perspective view showing the underside of the fastener shown in FIG. 4.
Figure 7:
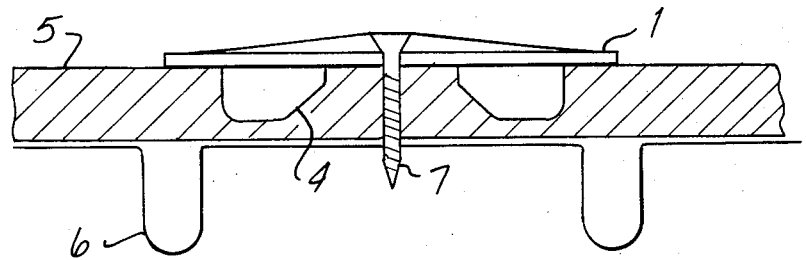
FIG. 7 is a sectional side view showing a fastener anchored in placed by a center screw through a metal deck substrate.
Figure 8:
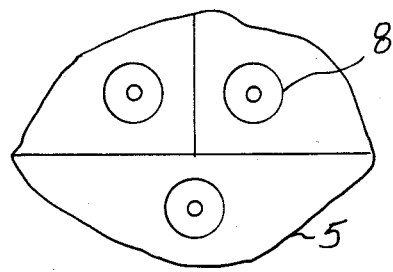
FIG. 8 is a plan view showing a prior art device for anchoring rigid insulation panels in a running bond pattern.
Figure 9:
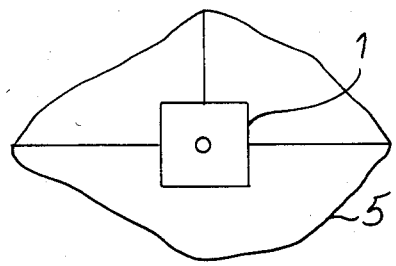
FIG. 9 is a plan view showing a fastener according to the present invention anchoring rigid insulation panels in a running bond pattern.
Figure 10:
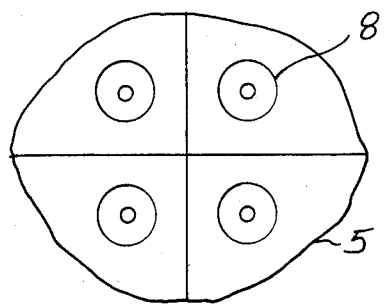
FIG. 10 is a plan view showing a prior art device for anchoring rigid insulation panels in a stack bond pattern.
Figure 11:
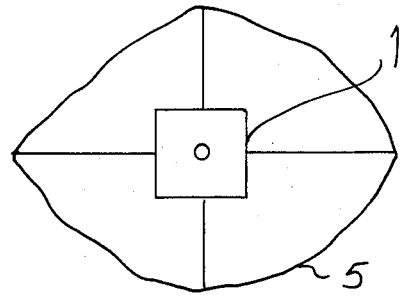
FIG. 11 is a plan view showing a fastener according to the present invention anchoring rigid insulation panels in a stack bond pattern.

The insulation pattern indicated in FIGS. 8 and 9 is commonly called "Running Bond", where the side edge of one board and corners of two other insulation boards intersect. Another pattern commonly referred to as "Stack Bond", is indicated in FIGS. 10 and 11, where the corners of four separate insulation boards intersect. The present invention of a "Rigid Insulation Corner Fastener" is designed to utilize one fastener with three vertical projections (ears, fins, legs) for installing rigid insulation in a "Running Bond" pattern and one fastener with four vertical projections for installing rigid insulation in a "Stack Bond" pattern.

The rigid insulation corner fastener 1 has a horizontal surface of various geometric shapes (round, square, elliptical, polygonal, etc.) and dimension. The horizontal surface can be formed with or without small stiffener ridges 2 to resist bending moment. On the underside of the horizontal surface, vertical projections 4, such as ears, legs, fins, etc. of various geometric shapes protrude down at 90 degrees to the horizontal surface. The invention requires these vertical projections to fit down into the lineal (0, 90, 180, 270 degree) intersecting joint pattern formed by the corners of adjacent rigid insulation boards as shown in FIGS. 9 and 11.

At the center of the horizontal surface, an adequate center pilot hole 3 is provided to facilitate top insertion of a nail, screw, bolt, etc. 7 down into or through the substrate 6. Setting tight the nail, screw, bolt, etc. draws the rigid insulation corner fastener to a compression condition against the top surface of the insulation 5 and secures the insulation from upward or lateral movement.

For comparison purposes, existing technology for securing insulation requires three or four discs 8 as shown in FIGS. 8 and 10 which depict prior art devices.

The rigid insulation corner fastener can be metal or plastic. If made of metal it is sheared, press blanked and formed. If made of plastic it is injection molded.

The metal used in metal fabrication of the rigid insulation corner fastener would be sheet or roll stock, of adequate gauge and stiffness (rigidity) to be formed into the shape, pattern or configuration required. The initial rough working dimension of the metal can be determined by shearing sheet stock or preset by the width of roll coil stock. With either sheet or coil stock, it is fed into a more precise cutting and forming machine such as a punch press. A "Cut and Form" die with male and female sections would impart the desired shape, form or finish to the metal. The die would cut the metal at the peripheral edge, cut the outline shape of the vertical projections and punch out the center pilot hole. The die would form (bend) the 90 degree downward projections referred to as ears, fins, legs, etc. Any reinforcing ridges or screw head recesses in the horizontal surface of the rigid insulation corner fastener would also be formed by the die.

Other methods of metal fabrication, such as but not limited to, a progressive die, drilling the center pilot hole, cutting by use of a metal shear or utilizing other bending or shaping tools, are not precluded in the fabrication of this invention.

The plastic used in plastic fabrication of the rigid insulation corner fastener would be adaptable to injection molding. The plastic would be forced into a cavity mold forming a rigid insulation corner fastener of the size and shape determined by the void within the mold. Vertical projections, referred to as ears, fins, legs, etc. would be formed as part of the void within the cavity mold, as would reinforcing ridges, holes or other design (features) criteria. The plastic, injection molded, rigid insulation corner fastener can be form-molded of one monolithic piece; however, if any holes voids or other design criteria are not included in the mold configuration they could be accomplished by other tools, heat, bending equipment etc.

The rigid insulation corner fastener can be used to secure insulation to various types of substrate surfaces (roof decks). The substrate may be wood, metal, concrete (regular or lightweight), existing membrane or other types of surfaces.

The rigid insulation corner fastener is not placed (installed) until after the rigid insulation is placed on the substrate (deck). Roof insulation can be placed in several patterns, the two most common patterns are "Stack Bond" and "Running Bond". Stack bond is typical of the pattern used for setting toilet room tile, where all edges of the individual pieces run parallel to each other and form straight lines. The joints from the appearance of "Plus (+)" signs. Running bond pattern is typical of the accepted practice for brick wall construction, where only the long edges of the individual pieces run parallel to each other and form straight lines. The short edges butt and form straight lines at 90 degrees from the mid-point of a previously installed piece. The joints form the appearance of upright and inverted "T" shapes. For the following description the running bond pattern will be the exemplar.

After placing the rigid insulation in the running bond pattern, the installer will notice all the intersecting corners of the insulation forming the "T" shape. Selecting one rigid insulation corner fastener, either metal or plastic, the installer will note the three vertical projections referred to as ears, fins, legs, etc. project-down at 90 degrees from the horizontal surface. The installer will then place one rigid insulation corner fastener at each "T" intersection formed by the corners of the insulation boards. It is obvious that the installer will not place the vertical projections up, since that would impair the roofing membrane to be subsequently installed. Rather, the installer would take the rigid insulation corner fastener and place the vertical projections down into the crack void, with the horizontal surface resting on top of the insulation boards. Then taking a nail, screw, bolt or other holding device, depending on the deck substrate, insert same into the provided center pilot hole of the rigid insulation corner fastener. After selecting the proper tool, hammer, drill, screw-driver, socket wrench, or other, the installer would drive, rotate, tighten, etc. until the holding device pulled the rigid insulation corner fastener to a tight compression condition on top of the insulation boards to be secured. The installer would continue this installation procedure until all corner intersection areas of the several insulation boards were covered and secured by a rigid insulation corner fastener.

The invention claimed is:

1. A fastener for use in a roof assembly having a substrate and rigid insulation panels disposed side-by-side over the substrate with opposing side and end edges of adjacent panels facing one another to form intersecting joints, the fastener comprising:

a one-piece plate means having a central aperture with a longitudinal axis and a generally flat planar surface engageable with outer faces of adjacent rigid insulation panels when disposed over one of said intersecting joints for securing said panels against wind lift-off by compresssively engaging said rigid insulation panels between the planar surface of the plate means and said substrate when the plate means is anchored to said substrate through the central aperture; and projection means extending perpendicularly outwardly from the planar surface of the plate means toward said substrate for securing said rigid insulation panels against lateral movement by inserting the projection means between opposing side and end edges of adjacent panels at intersecting corner joints.

2. The fastener of claim 1, further comprising ridge means formed on the plate for stiffening the plate against bending moment.

3. The fastener of claim 1, further comprising said projection means disposed aligned with radial planes extending from the longitudinal axis of the central aperture in the plate.

4. The fastener of claim 1, wherein the projection means further comprises:
a first fin disposed aligned on a first radial plane extending from the longitudinal axis of the central aperture in the plate; and
a second fin disposed aligned on a second radial plane extending from the longitudinal axis of the central aperture in the plate, the second radial plane disposed perpendicular to the first radial plane.

5. The fastener of claim 4, further comprising:
a third fin aligned on the second radial plane for securing rigid insulation panels in a running bond pattern, wherein the central aperture in the plate is disposed between the second and third fins.

6. The fastener of claim 4, further comprising:
a third fin aligned on the second radial plane, wherein the central aperture is disposed between the second and third fins; and
a fourth fin aligned on the first radial plane for securing rigid insulation panels in a stack bond pattern, wherein the central aperture in the plate is disposed between the first and fourth fins.

7. The fastener of claim 1, further comprising holding means engagable through the central aperture of the plate for securing the rigid insulation panels against wind lift-off by compressively engaging the panels between the planar surface of the plate and said substrate.

8. A fastener for use in a roof assembly having a substrate and rigid insulation panels disposed side-by-side over the substrate with opposing side and end edges of adjacent panels facing one another to form intersecting joints, the fastener comprising:
a one-piece plate having a central aperture with a longitudinal axis and a generally flat planar surface engageable with outer faces of adjacent rigid insulation panels when disposed over one of said intersecting joints for securing said panels against wind lift-off by compressively engaging said rigid insulation panels between the planar surface of the plate and said substrate when the plate is anchored to said substrate through the central aperture; and
a plurality of fins extending perpendicularly outwardly from the planar surface of the plate toward said substrate for securing said rigid insulation panels against lateral movement by inserting the plurality of fins between opposing side and end edges of adjacent panels at intersecting corner joints, the plurality of fins disposed aligned on intersecting perpendicular radial planes extending from the longitudinal axis of the central aperture in the plate.

9. The fastener of claim 8, further comprising holding means engagable through the central aperture of the plate for securing the rigid insulation panels against wind lift-off by compressively engaging the panels between the planar surface of the plate and said substrate.

10. The fastener of claim 8, further comprising ridge means formed on the plate for stiffening the plate against bending moment.

* * * * *